US007447529B2

(12) United States Patent
Gunter et al.

(10) Patent No.: US 7,447,529 B2

(45) Date of Patent: Nov. 4, 2008

(54) MODULAR COMMUNICATIONS DEVICES

(75) Inventors: David Charles Gunter, Middlesex (GB); Kenneth Albert Welch, Essex (GB)

(73) Assignee: Rascal Acoustics Limited, Harrow (GB)

( * ) Notice: Subject to any disclaimer, the term of this patent is extended or adjusted under 35 U.S.C. 154(b) by 209 days.

(21) Appl. No.: 10/451,413

(22) PCT Filed: Dec. 14, 2001

(86) PCT No.: PCT/IB01/02527

§ 371 (c)(1), (2), (4) Date: Dec. 22, 2003

(87) PCT Pub. No.: WO02/052738

PCT Pub. Date: Jul. 4, 2002

(65) Prior Publication Data

US 2004/0082360 A1 Apr. 29, 2004

(30) Foreign Application Priority Data

Dec. 22, 2000 (GB) ................................ 0031461.7

(51) Int. Cl.
*H04M 1/00* (2006.01)

(52) U.S. Cl. .................. 455/575.2; 455/78; 455/191.3; 455/349; 455/556.1; 379/430; 379/431

(58) Field of Classification Search ................ 455/90.3
See application file for complete search history.

(56) References Cited

U.S. PATENT DOCUMENTS

| | | | | |
|---|---|---|---|---|
| 3,586,977 | A | 6/1971 | Lustig et al. | |
| 4,352,353 | A * | 10/1982 | Bolton et al. | 128/201.24 |
| 5,790,947 | A | 8/1998 | Dieringer | |
| 6,298,249 | B1 * | 10/2001 | Locarno et al. | 455/575.2 |
| 6,311,052 | B1 * | 10/2001 | Lenz | 455/305 |

FOREIGN PATENT DOCUMENTS

| | | |
|---|---|---|
| JP | 2000-354088 | * 12/2000 |

* cited by examiner

*Primary Examiner*—Nay Maug
*Assistant Examiner*—Zhiyu Lu
(74) *Attorney, Agent, or Firm*—Lowe Hauptman Ham & Berner, LLP

(57) ABSTRACT

A set of parts for assembly into a reconfigurable communications device has at least an earpiece (16) a microphone (20) and a press-to-talk switch (24). These parts can be assembled together by respective connectors (19,22,26,29) and the device can be reconfigured by disconnecting and reconnecting with other parts of the set (for example different forms of switch and microphone) to meet other operational requirement.

18 Claims, 10 Drawing Sheets

MODULAR COMMUNICATIONS DEVICES

This invention relates to a set of parts for assembly into a reconfigurable communications device.

One form of communications device comprises a microphone, an earpiece, and a switch operable to enable voice transmission from the device. An example of this is a conventional communications headset in association with a radio transceiver press-to-talk switch. Another example is shown in WO-97/25832 where the microphone and earpiece are arranged in a housing for attachment to a protective helmet and a cable leads through a connector to a control box and transceiver.

It is a problem with such devices that they are not usable in all circumstances. For example, if a single press-to-talk switch is provided it is not usable with two radios. In other circumstances, different forms of switches operable in different ways may be desirable. It may also be desirable to use different forms of microphone and to provide different ways of supporting the components on the user's body.

These requirements in the past have generally been met by providing different complete communications devices. It will be appreciated, however, that this is both complicated and expensive, and it is an aim of the invention to provide a modular form of communications device that can be readily reconfigured to suit different operational requirements.

According to the invention, there is provided a set of parts for assembly into a reconfigurable communications device, said set including at least:— a first part comprising an earpiece and connector means for demountable connection to connector means of another part or parts of the set;

a second part comprising a microphone and connector means for demountable connection to connector means of another part or parts of the set; and a third part comprising a switch operable to enable voice transmission from the device and connector means for demountable connection to connector means of another part or parts of the set;

whereby in use a communications device can be assembled by connecting together the connector means of selected parts of the set and can be reconfigured by selectively disconnecting the same and reconnecting with other parts of the set. In other words, parts of the device can remain the same but those needing changing for different circumstances can be added, removed or replaced.

The invention also resides in a communications device assembled from selected parts of a said set and in the method of assembling and reconfiguring such a device.

The following is a more detailed description of some preferred embodiments of the invention, by way of example, reference being made to the accompanying drawings in which:—

Figure 1:
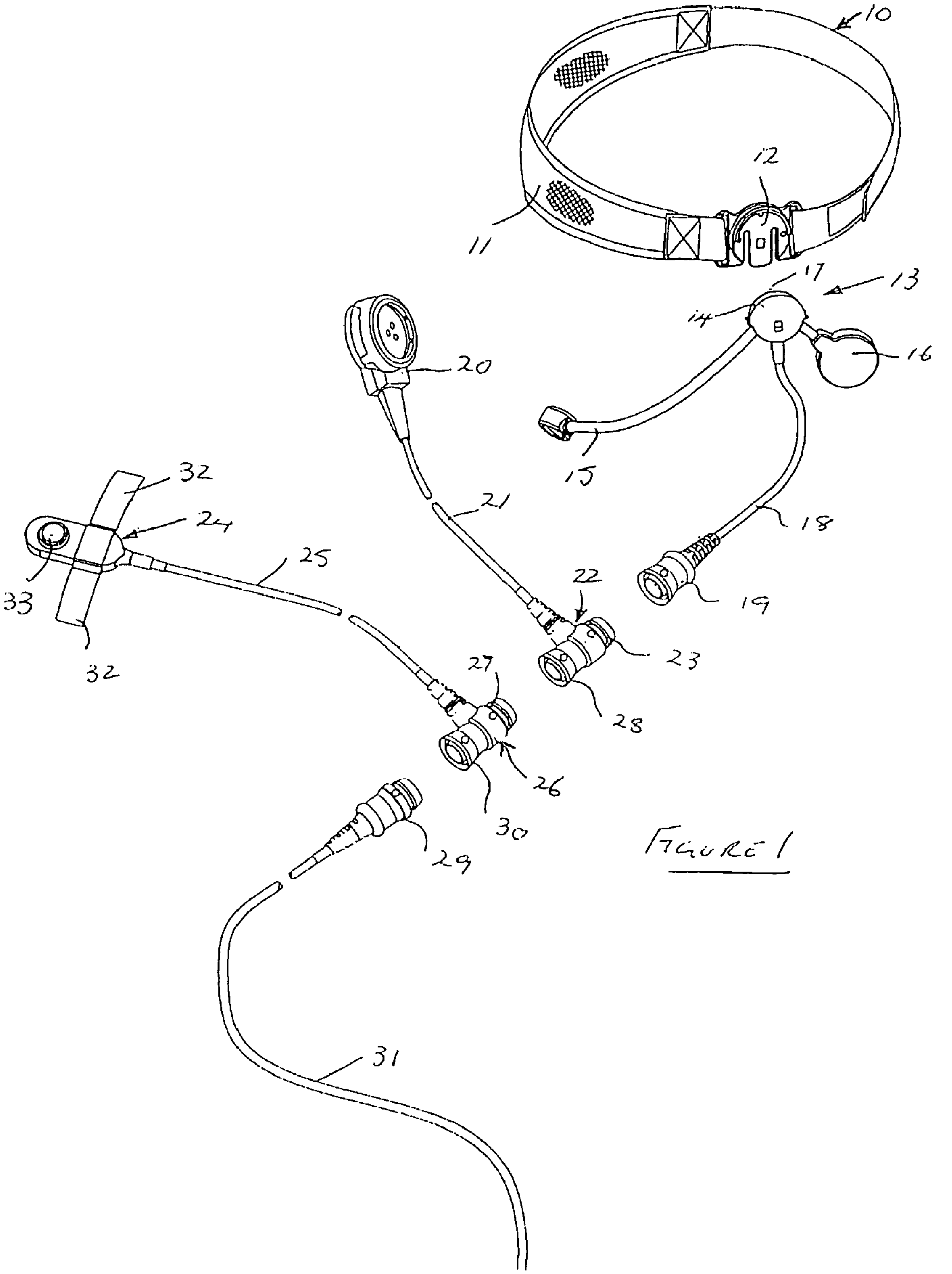
FIG. 1 is an exploded view of a first form of communications device including a head strap, a single-sided headset, a respirator microphone and a palm press-to-talk switch.

Referring first to FIG. 1, the first communications device is shown for mounting on a headstrap 10 which may be made from a combination of soft cotton and mesh material 11 to provide comfort and ventilation. The headstrap 10 can be worn on a bare head, with berets or under helmets and provides a stable platform for the communications device during strenuous activities. The headstrap 10 includes a first mounting part 12.

The first communications device comprises a headset unit indicated generally at 13 formed with a boss 14 to one side of which extends a boom microphone 15 and to the other side of which extends an earpiece 16. The boss 14 carries a second mounting part 17 which is a snap fit with the first mounting part 12 on the headstrap 10 to mount the unit 13 on the headstrap 10.

A connecting cable 18 also extends from the boss 12 and terminates in a first connector part 19. A microphone 20 for use with a respirator of the kind worn, for example, in battlefield situations, is connected via a cable 21 to a T-connector 22. One limb 23 of the T-connector 22 is a snap fit with the first connector part 19. A palm-mounted press-to-talk switch 24 is connected via a cable 25 to a second T-connector 26. One limb 27 of the second T-connector 26 is a snap fit with the second limb 28 of the first T-connector 22. An in-line connector 29 is a snap fit to the second limb 30 of the second T-connector 26 and is connected to a cable 31 that leads to, for example, a radio (not shown).

In operation, therefore, the headstrap 10 is worn around the head of a user and the unit 13 is snap-fitted on to the headstrap 10 via the first and second mounting parts 12,17. The respirator microphone 20 is connected to the respirator (in this embodiment the boom microphone 15 is not used). The palm press-to-talk switch 24 is strapped around the wrist using straps 32 so that a button 33 of the press-to-talk switch 24 lies within the palm of the user. The user can thus press the button 33 to activate the radio and speak via the respirator microphone 20.

Further embodiments of the invention will now be described with reference to FIGS. 2 to 10. In these Figures, parts common to the communications device of FIG. 1 and the communications devices of FIGS. 2 to 10 will be given the same reference numerals and will not be described again in detail.

Figure 2:
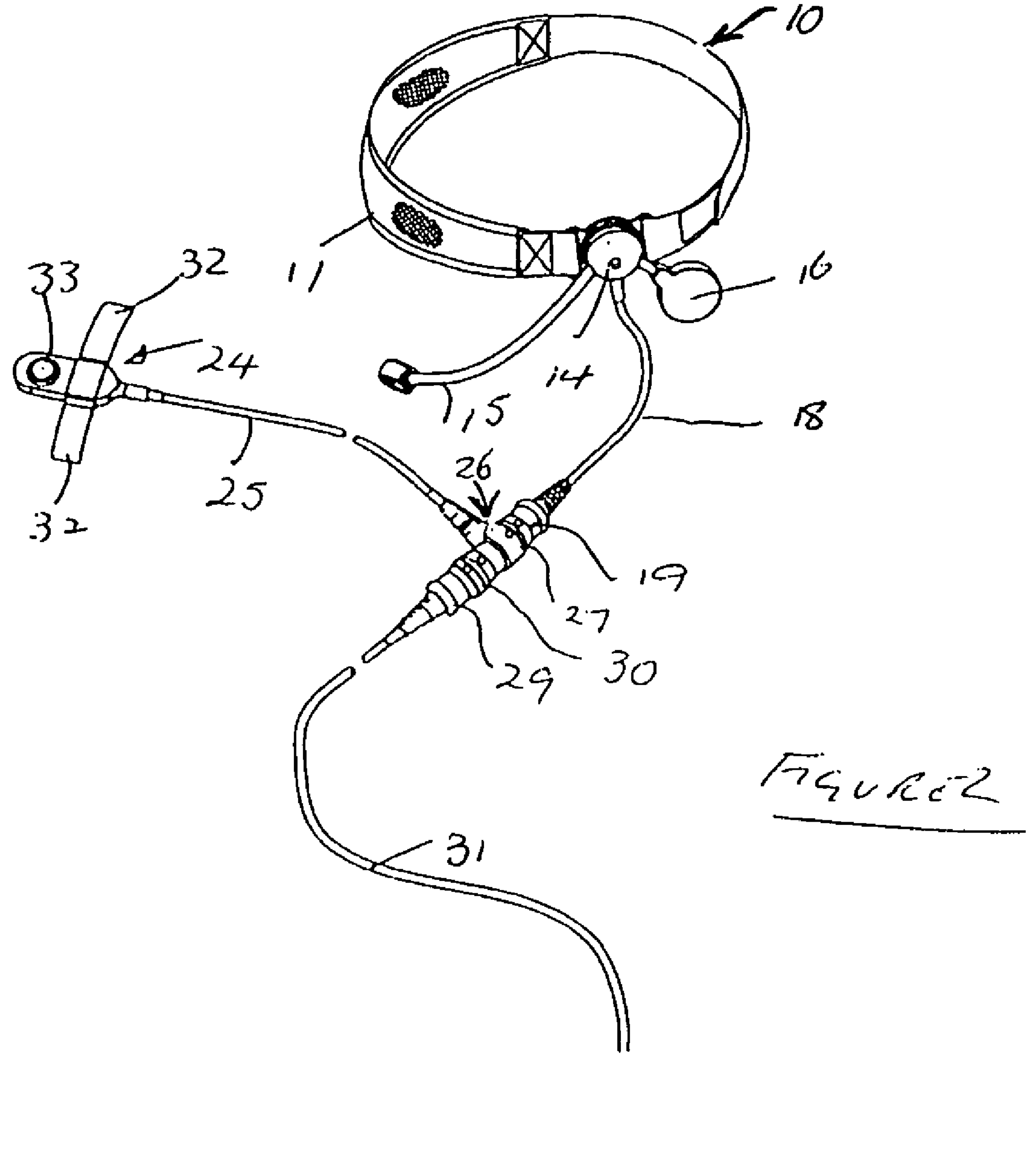
FIG. 2 is a second form of communications device which is similar to the first ford of communications device but omits the respirator microphone.

Referring next to FIG. 2, the second communications device is similar to the first communications device of FIG. 1 but has the respirator microphone 20 removed so that the first limb 27 of the second T-connector 26 snap-fits into the first connector part 19 and in this case the user speaks through the microphone 15.

Figure 3:
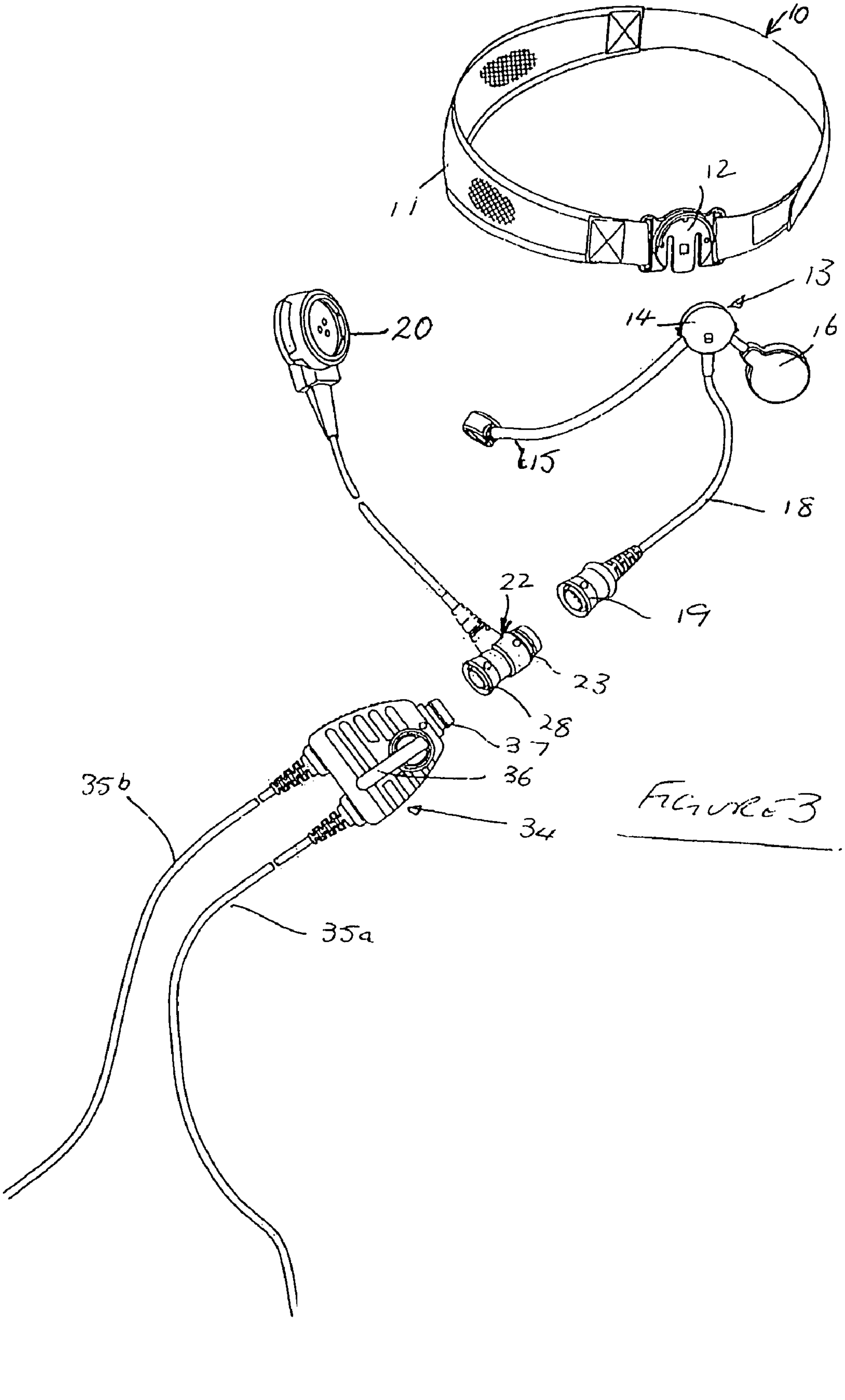
FIG. 3 is a third form of communications device which is similar to the first form of communications device but omits the palm press-to-talk switch and includes a dual monitor press-to-talk switch.

Referring next to FIG. 3, the third communications device is similar to the first communications device except that the palm press-to-talk switch 24 and the second connector part 29 are removed. These are replaced by a clothing mounted, dual monitor, press-to-talk switchbox 34 including two cables 35*a*, 35*b* for connection to respective radios, not shown. The dual press-to-talk switchbox 34 includes a switch 36 that can be rotated to connect the respirator microphone 20 to, and activate, a selected one of two radios. The dual press-to-talk switchbox 34 includes a connector 37 which is a snap-fit with the second limb 28 of the T-connector 22 of the respirator microphone 20.

Figure 4:
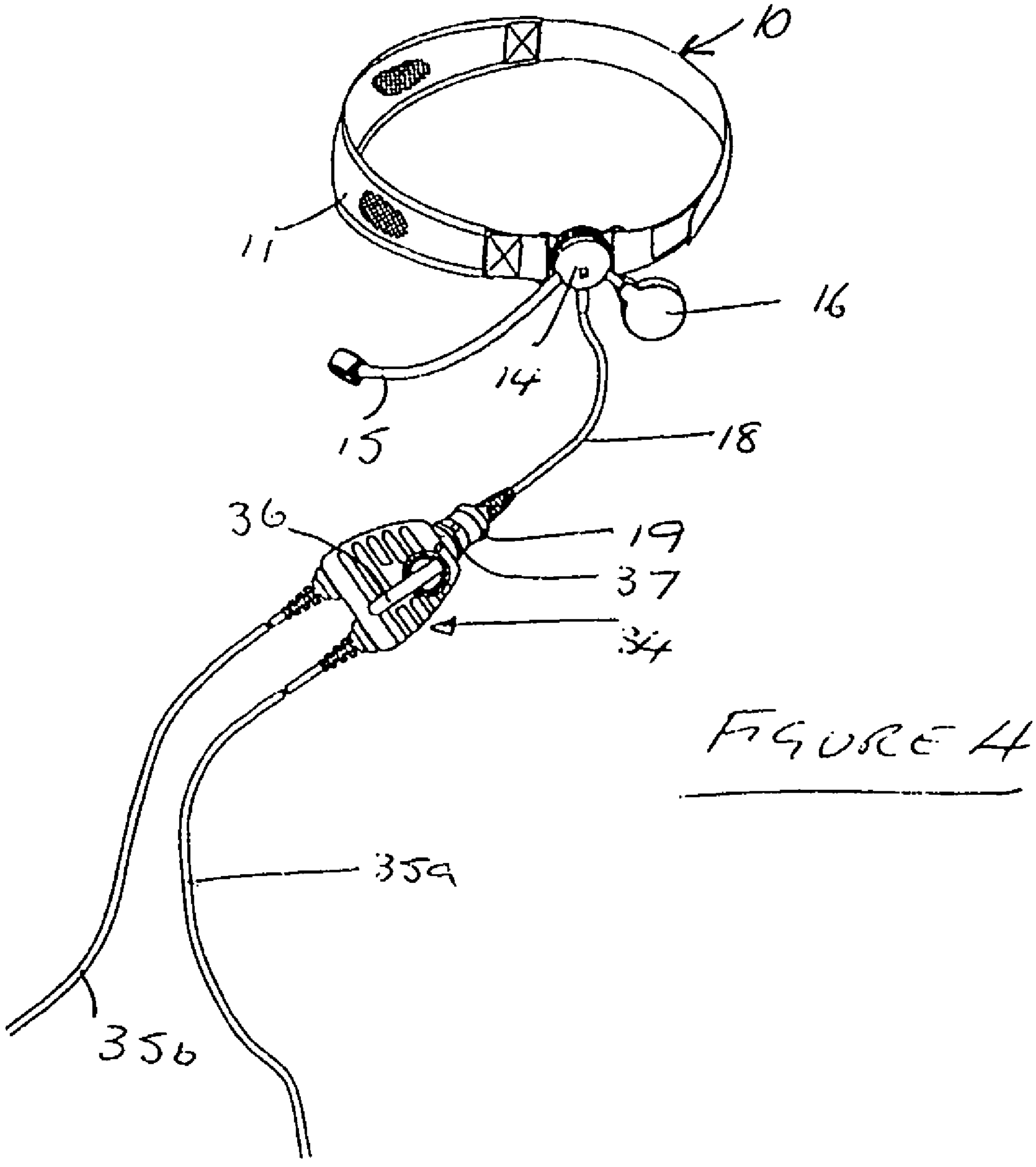
FIG. 4 shows a fourth communications device which is similar to the third communications device but omits the respirator microphone.

Referring now to FIG. 4, the fourth communications device is similar to the third communications device except that the respirator microphone 20 is removed and the connector on the dual press-to-talk switchbox 34 is snap-fitted directly to the first connector part 19 and in this case the user speaks through the microphone 15.

Figure 5:
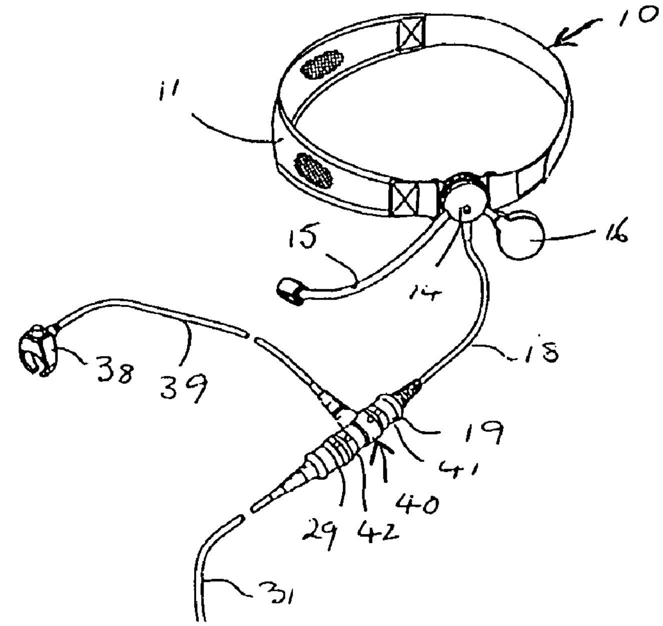
FIG. 5 shows a fifth form of communications device which is similar to the first form of communications device but omits the respirator microphone and the palm press-to-talk switch but includes a ring press-to-talk switch.

Referring next to FIG. 5, the fifth communications device is similar to the first communications device except that the respirator microphone 20 and the palm press-to-talk switch 24 are removed and replaced by a ring press-to-talk switch 38. This ring press-to-talk switch 38 is connected via a cable 39 to a third T-connector 40 which has one limb 41 a snap-fit with the first connector part 19 and a second limb 42 a snap-fit connection to the second connector part 29.

Figure 6:
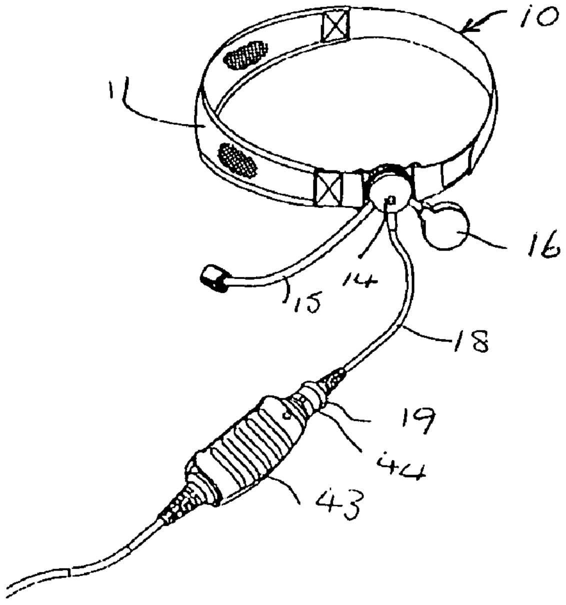
FIG. 6 is a sixth form of communications device which is similar to the fifth form of communications device but has the ring press-to-talk switch replaced by a single press-to-talk switch.

Referring next to FIG. 6, the sixth communications device is similar to the fifth communications device but has the ring press-to-talk switch 38 replaced by a single clothing mounted press-to-talk switchbox 43. This box is a moulded polyurethane, fully waterproof box with an integral clothing clip (not shown). The box terminates in a connector part 44 which is a snap-fit with the first connector part 19.

Figure 7:
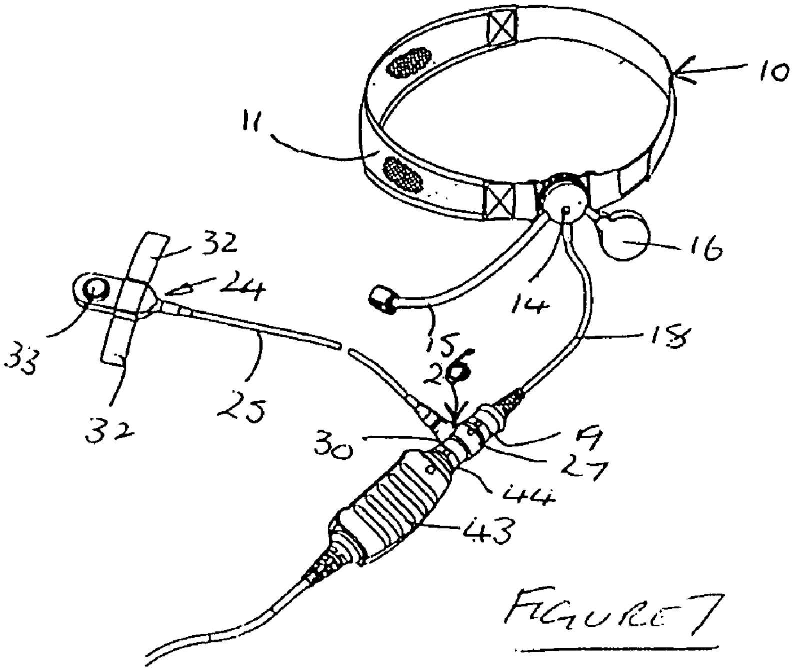
FIG. 7 shows a seventh form of communications device which is similar to the sixth form of communications device but adds a palm-mounted press-to-talk switch.

Referring next to FIG. 7, the seventh communications device is similar to the sixth communications device but adds the palm press-to-talk switch 24 described above with reference to FIG. 1. The T-connector 26 of this palm press-to-talk switch 24 is inserted between the first connector part 19 and the connector part 44 on the clothing mounted press-to-talk switchbox 43. This allows an alternative way of actuating the radio.

Figure 8:
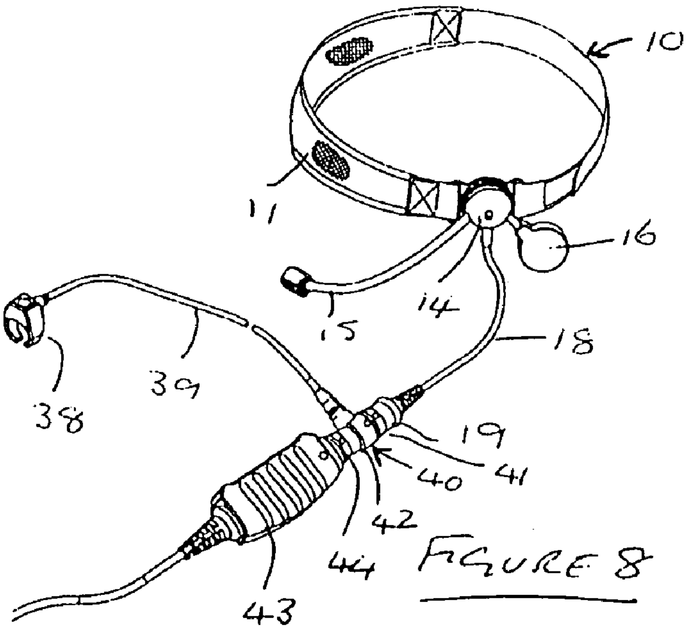
FIG. 8 shows an eighth form of communications device which is similar to the seventh form of communications device but replaces the palm press-to-talk switch with a ring press-to-talk switch.

Referring next to FIG. 8, the eighth communications device is similar to the seventh communications device but replaces the palm press-to-talk switch 24 with a ring press-to-talk switch 38 as described above with reference to FIG. 5. The T-connector 40 of the ring press-to-talk switch 38 is inserted between the clothing press-to-talk switch 44 and the first connector part 19. Again, this provides an alternative means of actuating the radio.

Figure 9:
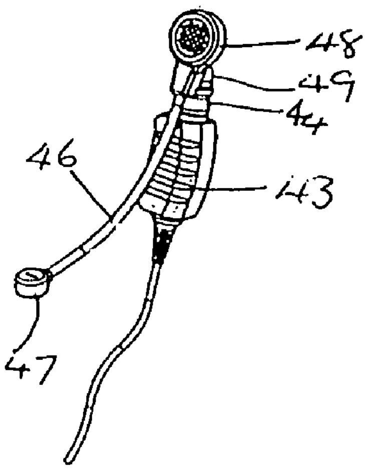
FIG. 9 shows a ninth form of communications device in the form of a skeletal handset and a single press-to-talk switch.

Referring next to FIG. 9, the ninth communications device comprises an arcuate rod 46 having a microphone 47 at one end and an earpiece 48 at the other end. The earpiece carries a connector part 49 which is connected to the connector part 44 of the single press-to-talk switchbox 43. This can be used in the same way as a hand-held field telephone.

Figure 10:
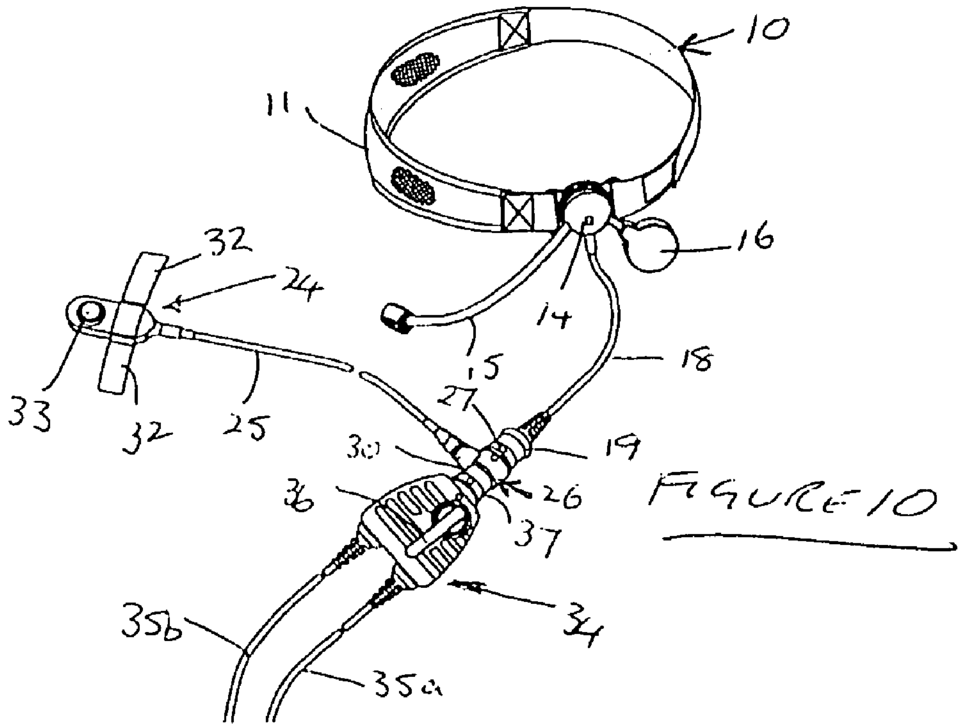
FIG. 10 shows a tenth form of communications device which is similar to the seventh form of communications device but replaces the single press-to-talk switch with a dual press-to-talk switch.

Referring next to FIG. 10, the tenth communications device is similar to the seventh communications device except that the single press-to-talk switchbox 43 is replaced by the dual press-to-talk switchbox 34 described above with reference to FIG. 3.

It will be appreciated that these are only examples of combinations that can be produced using the parts described above. Other combinations are possible. It will also be appreciated that, while the communications devices described above have a microphone 15, 47 and an earpiece 16, 48 permanently connected together, this need not be so. The microphone 15, 47 and/or the earpiece 16,48 may be replaced using connectors of the kind described above or other connectors.

Although the connectors described above with reference to the drawings are snap-fit connectors, they need not be snap-fit connectors. They could, for example be connectors that screw together.

Figure 11:
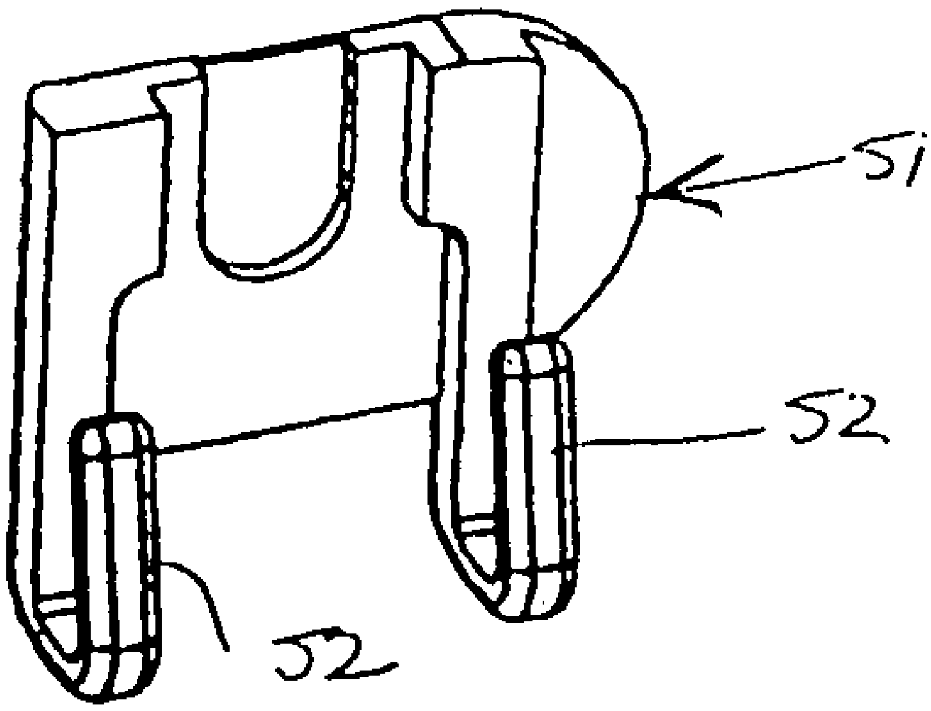
FIG. 11 shows a helmet-mounted clip for carrying any one of the communications devices of FIGS. 1-8 or 10.
Figure 12:
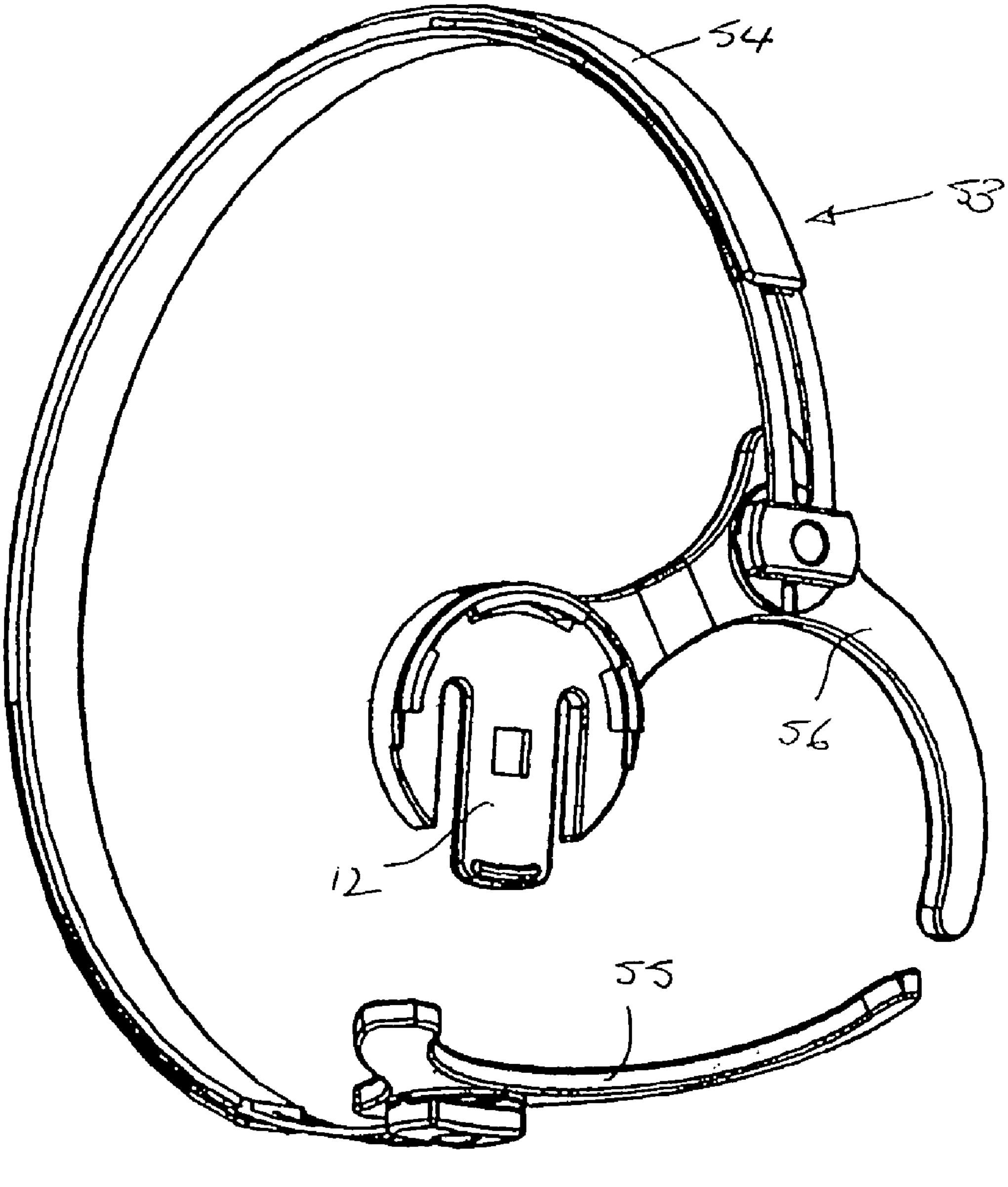
FIG. 12 shows a single ear overhead band for carrying any one of the communications devices of FIGS. 1-8 or 10.
Figure 13:
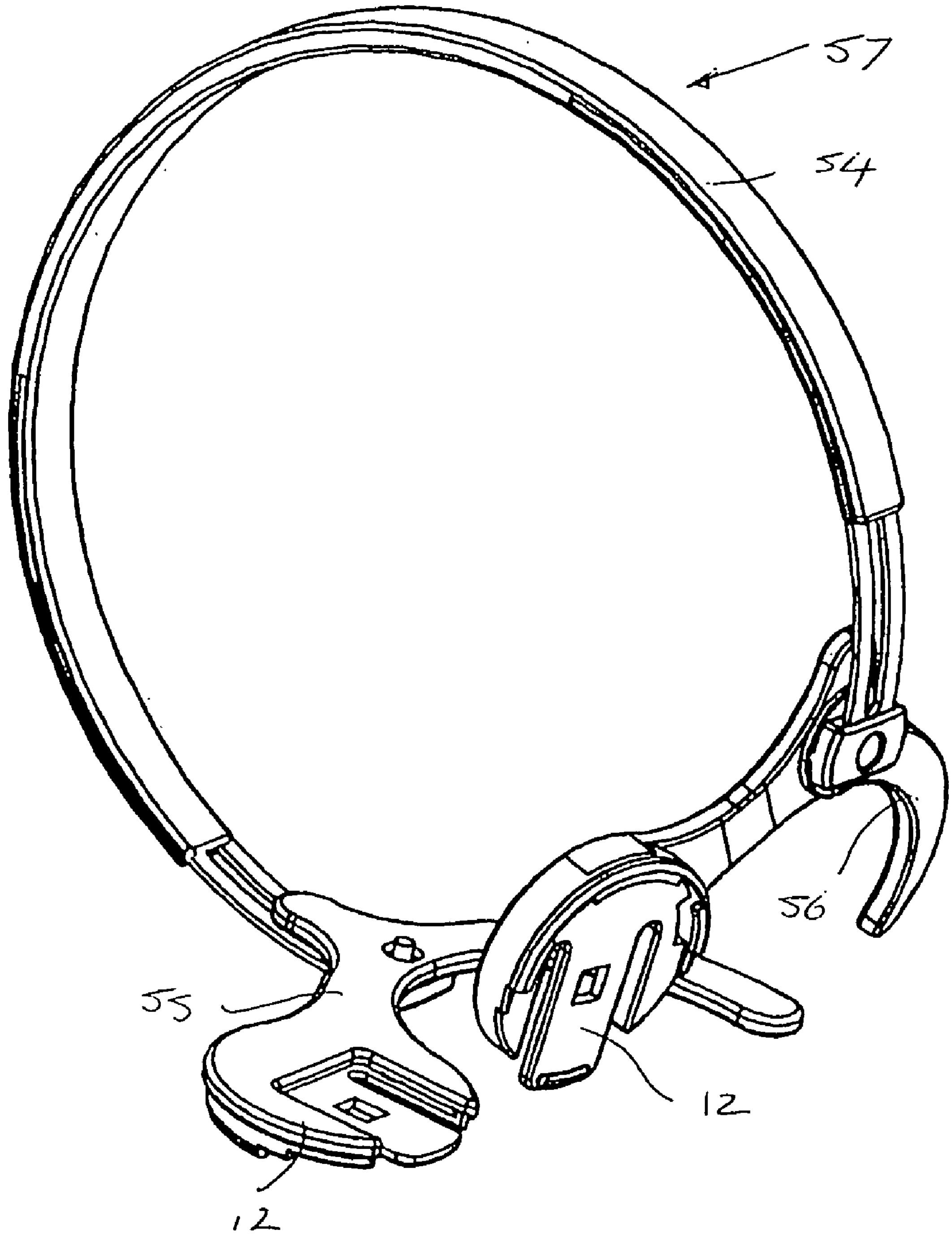
FIG. 13 shows a double ear overhead band.

Referring now to FIGS. 11, 12 and 13 there will now be described three alternatives to the headstrap 10.

Referring first to FIG. 11, a clip 51 includes a pair of parallel-spaced upwardly directed hooks that allow the clip to be attached to the rim of a helmet. The clip also includes a mounting on its reverse side which is the same as the first mounting part 12 on the headstrap 10. This allows the connection to the clip 51 of any one of the communications devices described above with reference to FIGS. 1 to 8 and 10.

Referring next to FIG. 12, a headband 53 includes a part 54 for passing over the top of a person's head. The band terminates at one end in a first yoke 55 for resting around the side of a head of a wearer above one ear and at the opposite end in a second yoke 56 for extending around the side of the head above the other ear and carrying at one end a mounting part 12 identical to the first mounting part 12 on the headstrap 10. The positions of the first and second yokes 55,56 may be adjustable relative to the band part 54. The band can thus carry any one of the communications devices described above with reference to FIGS. 1 to 8 and 10.

Referring next to FIG. 13, the double overhead band 57 is similar to the single overhead band 53 except that the first yoke 55 also carries a mounting 12 which is a mirror image to that carried by the headstrap 10. This means that an additional earpiece (not shown) linked to the unit 13 can be mounted on this band.

It will be appreciated that there may be other ways of mounting the communications devices than those described above.

The invention claimed is:

1. A kit of parts for assembly into a reconfigurable communications device, said kit of parts comprising:

a communications earpiece including an earpiece and earpiece connector means;

a communications microphone including a microphone and microphone connector means; and a voice transmission switch including a switch operable to enable voice transmission from said reconfigurable communication device assembled from said kit of parts and voice transmission switch connector means;

wherein the earpiece connector means is arranged to demountably connect directly to the microphone connector means and to the voice transmission switch connector means, the voice transmission switch connector means is arranged to demountably connect directly to the earpiece connector means and to the microphone connector means, and the microphone connector means is arranged to demountably connect directly to the earpiece connector means, and to the voice transmission switch connector means, whereby in use said reconfigurable communications device can be assembled by connecting together the connector means of two or more of the communications earpiece, the communications microphone and the voice transmission switch, and can be reconfigured by selectively disconnecting said connector means of said two or more of the communications earpiece, the communications microphone and the voice transmission switch and reconnecting said connector means of said two or more of the communications earpiece, the communications microphone and the voice transmission switch in different connection or reconnecting the connector means of any two of the communications earpiece, the communications microphone and the voice transmission switch.

2. The kit of parts according to claim 1, wherein said communications earpiece also comprises a microphone, of different configuration to said microphone of the communications microphone.

3. The kit of parts according to claim 1, wherein said microphone of the communications microphone is adapted for use with a respirator.

4. The kit of parts according to claim 1, wherein said communications microphone has two microphone connector means arranged so as to demountable directly connect between the communications earpiece and the voice transmission switch.

5. The kit of parts according to claim 1, wherein said voice transmission switch is adapted to be mounted in the palm of a user.

6. The kit of parts according to claim 1, wherein voice transmission switch has two connector means arranged so as to demountable directly connect between the communications earpiece and the communications microphone.

7. The kit of parts according to claim 1 including one or more further parts each comprising a switch, of different configurations to said voice transmission switch, operable to enable voice transmission from the device, and connector means arranged to demountable connect directly to connector means of any one or more of: the communications earpiece, the communications microphone, the voice transmission switch.

8. The kit of parts according to claim 7, wherein the switch of a said further part is a clothing-mounted dual press-to-talk switch.

9. The kit of parts according to claim 7, wherein the switch of a said further part is adapted to be mounted around a finger of a user.

10. The kit of parts according to claim 7, wherein the switch of a said further part is a clothing-mounted single press-to-talk switch.

11. The kit of parts according to claim 1, including a further part comprising a microphone, of different configuration to said microphone of the communications microphone, and an earpiece, of different configuration to said earpiece of the communications earpiece, and connector means arranged to demountable connect to connector means of any one or more of: the communications earpiece, the communications microphone, the voice transmission switch.

12. The kit of parts according to claim 1, including one or more further parts each having a mounting portion by which said communications earpiece can be demountably supported so as to position the earpiece thereof adjacent to a user's ear.

13. The kit of parts according to claim 12, wherein a said further part comprises a strap to encircle a user's head.

14. The kit of parts according to claim 12, wherein a said further part comprises a clip for attachment to a user's helmet.

15. The kit of parts according to claim 12 wherein a said further part comprises a band to pass over the top of a user's head.

16. A communications device assembled from selected parts of a kit of parts according to claim 1.

17. A method of assembling and reconfiguring a communications device which comprises connecting together the connector means of selected parts of a kit of parts according to claim 1, selectively disconnecting the same and reconnecting with the connector means of a selected other part or parts of the kit of parts.

18. A kit of parts for assembly into a reconfigurable communications device, said kit of parts comprising:

a communications earpiece including an earpiece and earpiece connector means;

a communications microphone including a microphone and microphone connector means; and a voice transmission switch including a switch operable to enable voice transmission from the reconfigurable communication device assembled from said kit of parts and voice transmission switch connector means;

wherein one or both of the microphone connector means and the voice transmission switch connector means comprises two connector members each arranged to demountably connect directly to a respective other of the earpiece connector means, the microphone connector means and the voice transmission switch connector means so as to demountably directly interconnect a respective two others of the communications earpiece, the communications microphone and the voice transmission switch;

wherein the earpiece connector means is arranged to demountably connect directly to the microphone connector means and to the voice transmission switch connector means, the voice transmission switch connector means is arranged to demountably connect directly to the earpiece connector means and to the microphone connector means, and the microphone connector means is arranged to demountably connect directly to the earpiece connector means and to the voice transmission switch connector means, whereby in use said reconfigurable communications device can be assembled by connecting together the connector means of two or more of the communications earpiece, the communications microphone and the voice transmission switch, and can be reconfigured by selectively disconnecting said connector means of said two or more of the communications earpiece, the communications microphone and the voice transmission switch and reconnecting said connector means of said two or more of the communications earpiece, the communications microphone and the voice transmission switch in different connection or reconnecting the connector means of any two of the communications earpiece, the communications microphone and the voice transmission switch.

* * * * *